United States Patent [19]

Carollo

[11] Patent Number: 5,622,742
[45] Date of Patent: Apr. 22, 1997

[54] METHOD OF MAKING STUFFED PIZZAS AND/OR STUFFED SANDWICHES

[76] Inventor: Vincenzo Carollo, 273 Blackbaron Dr., Delran, N.J. 08075

[21] Appl. No.: 568,102

[22] Filed: Dec. 6, 1995

[51] Int. Cl.$^6$ .................................................. A21D 13/00
[52] U.S. Cl. .......................... 426/279; 426/138; 426/275; 426/280; 426/283; 426/289; 426/296; 426/391; 426/446; 426/496; 426/514; 426/518; 425/292; 99/430; 99/432
[58] Field of Search .................. 426/94, 138, 275, 426/279, 280, 282, 283, 289, 293, 296, 391, 496, 503, 505, 512, 514, 518, 549, 446; 425/292; 99/380, 383, 416, 427, 430, 432, 442, 450.4, 450.5, 450.6, 494

[56] References Cited

U.S. PATENT DOCUMENTS

| | | | |
|---|---|---|---|
| 1,144,794 | 6/1915 | Rousseau | 426/283 |
| 1,814,485 | 7/1931 | Moss | 426/283 |
| 1,888,562 | 11/1932 | Trompeter | 426/391 |
| 2,363,395 | 11/1944 | Calia | 426/283 |
| 2,386,993 | 10/1945 | Valdastri, Sr. | 426/283 |
| 3,083,651 | 4/1963 | Cooper | 426/275 X |
| 3,539,354 | 11/1970 | Colvin | 426/275 |
| 3,656,968 | 4/1972 | Allen | 426/283 X |
| 4,216,241 | 8/1980 | Thompson | 426/496 X |
| 4,382,970 | 5/1983 | Sorensen | 426/275 |

Primary Examiner—Esther Kepplinger
Assistant Examiner—Milton I. Cano
Attorney, Agent, or Firm—Caesar, Rivise, Bernstein, Cohen & Pokotilow, Ltd.

[57] ABSTRACT

A baking pan and method of use for baking plural stuffed pizzas and/or plural stuffed sandwiches therein. Each of the pizzas and/or sandwiches includes a dough shell and a stuffing within the shell. The pan basically comprises a base panel and four cavities. The base panel is a planar sheet of circular profile and having a rounded flanged peripheral edge. Each cavity is frusto-conically shaped and includes a generally planar bottom wall and a frusto-conical side wall flaring upward and outward therefrom. Each sidewall terminates at its upper end in a rounded top peripheral edge which is disposed slightly above the base panel. The rounded top edge of each cavity is arranged for joining a respective portion of baking dough disposed within its associated cavity to a sheet portion of baking dough disposed over the base panel and on top of its cavity along the periphery of the rounded top peripheral edge to form a stuffed dough shell having a joined seam extending about the periphery of the shell. The rounded top edge of each cavity is also arranged for severing portions of the baking dough located outside the periphery of the joined seam of the stuffed dough shell from the stuffed dough shell itself.

4 Claims, 4 Drawing Sheets

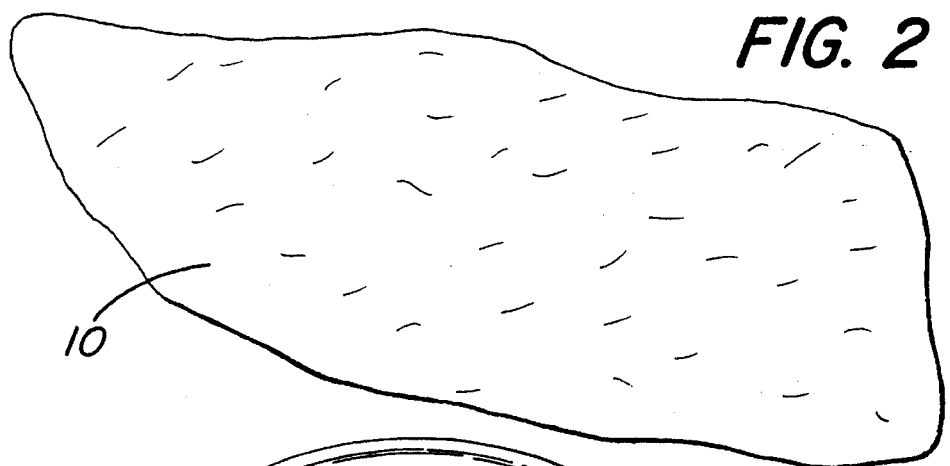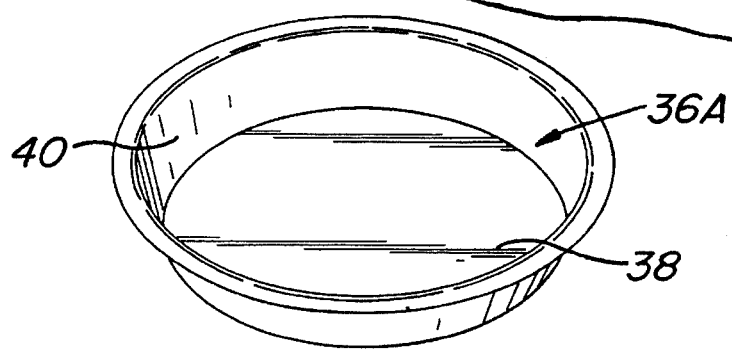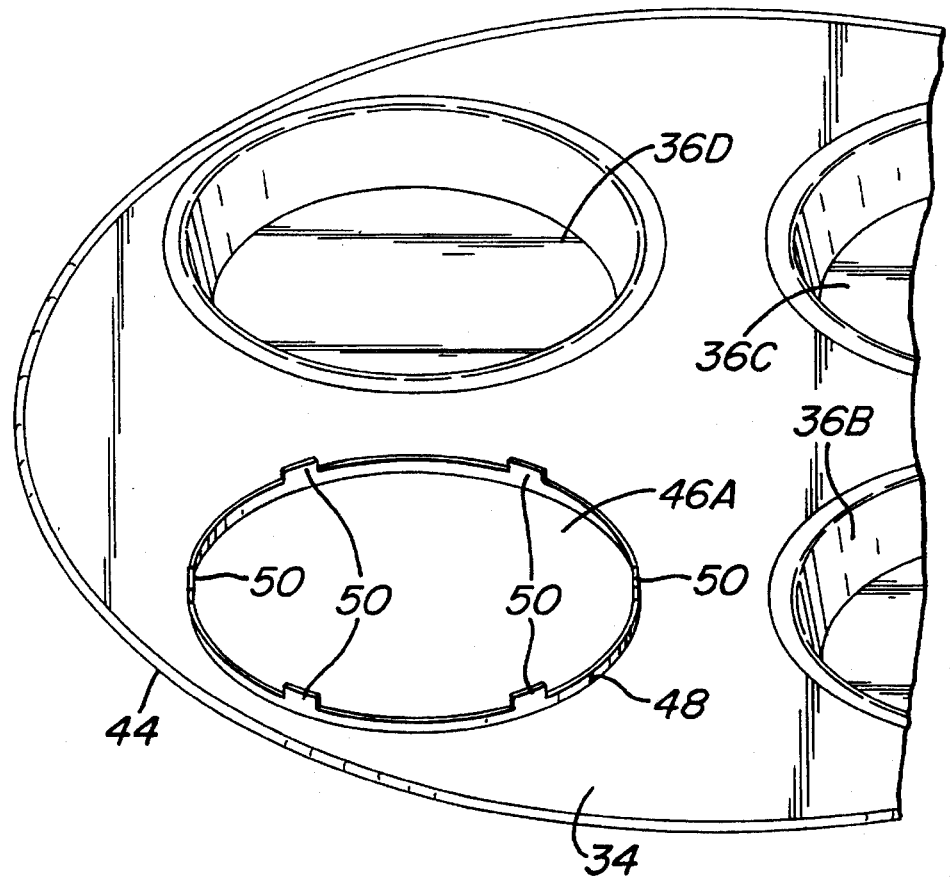
FIG. 2

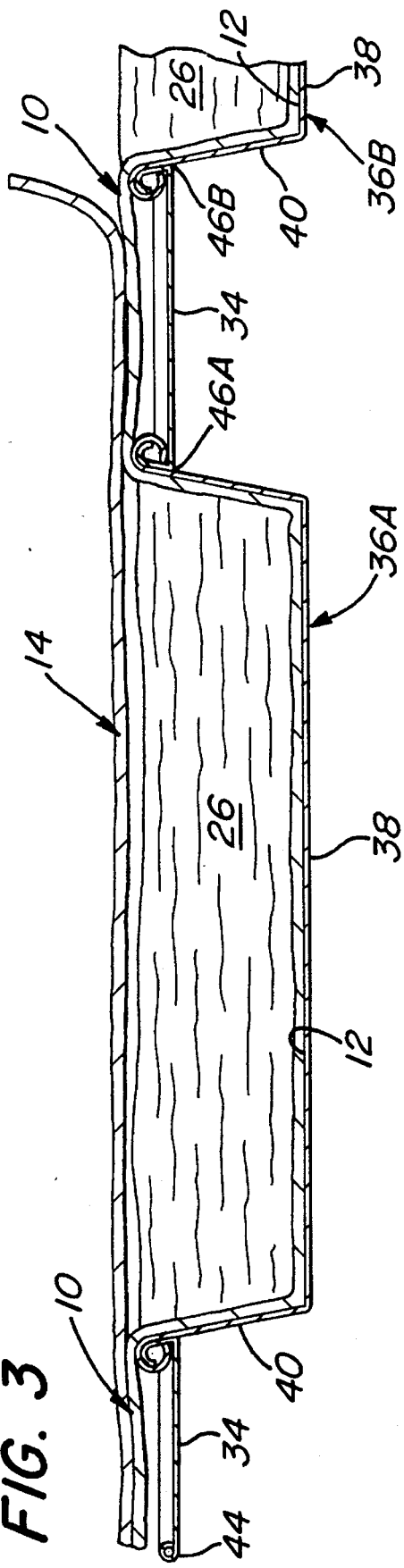
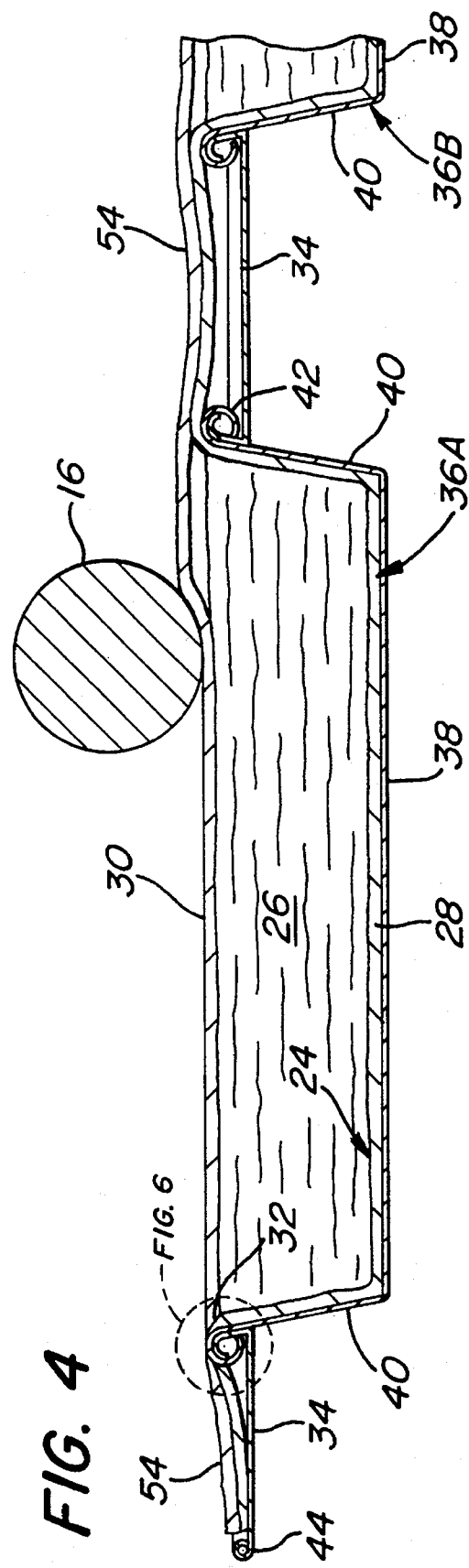

METHOD OF MAKING STUFFED PIZZAS AND/OR STUFFED SANDWICHES

BACKGROUND OF THE INVENTION

The invention relates generally to food preparation devices, and more particularly to pans for use in making stuffed pizza and/or stuffed sandwiches.

So called "stuffed pizzas" or "stuffed sandwiches" commercially available today are typically in the form of a baked dough shell enclosing some food ingredients (i.e., the "stuffing(s)"). The stuffing(s) can be of various compositions, depending upon the desired product. For example, in the case of stuffed pizzas the stuffing(s) typically comprise one or more of the following: tomato sauce, cheese, spices, vegetables (e.g., onions, green peppers, mushrooms, etc.), meats (e.g., pepperoni, ground beef, ham, bacon, etc.).

In order to make the stuffed pizza or stuffed sandwich an uncooked hollow dough "shell" or "pocket" is formed to hold the desired stuffing(s). The particular stuffing(s) is(are) introduced into the shell/pocket and the shell/pocket is then sealed along a seam line or joint to hold the stuffing(s) inside. The uncooked stuffed pizza/sandwich shell/pocket is then baked in an oven to cook it. If the hollow dough shell/pocket is prepared and sealed properly the resulting stuffed pizza or sandwich should be relatively leak-proof, i.e., the stuffing will not leak out the seam(s), even if the stuffing is itself of a leaky consistency. Heretofore the hollow shells/pockets used to form stuffed pizzas and/or stuffed sandwiches have been of various shapes. One particularly, common shape is a small pie-like or tart-like shape. Another common shape is rectangle, with somewhat rounded corners. The shell/pocket and can be pre-made or made to order at the time that the pizza/sandwich is made.

The formation of stuffed pizzas and/or stuffed sandwiches as described above has generally been a hit or miss proposition, depending upon the skill of the maker, the amount of preparation time devoted to the formation of the pizza/sandwich, and the type of equipment utilized. Thus, some businesses have been quite successful in producing stuffed pizzas and/or stuffed sandwiches in quantity, and with repeatable high quality results. Other business have not achieved such repeatable, economical results.

Thus, there is a need for a pan and a method of use to enable the rapid and easy formation of consistent, high quality, evenly cooked, leak-proof, stuffed pizzas and/or stuffed sandwiches.

OBJECTS OF THE INVENTION

It is a general object of this invention to provide a multi-cavity baking pan and method of use which addresses that need.

It is a further object of this invention to provide a pan and method of use for forming plural stuffed pizzas and/or plural stuffed sandwiches therein and for enabling the baking of the pizzas and/or sandwiches therein.

It is still a further object of this invention to provide a pan which is easy to use for forming and baking plural stuffed pizzas and/or stuffed sandwiches therein.

It is still a further object of this invention to provide a baking pan which is effective for evenly and quickly baking plural stuffed pizzas and/or stuffed sandwiches.

It is yet a further object of this invention to provide a baking pan which is effective for baking stuffed pizzas and/or stuffed sandwiches to render such pizzas and/or sandwiches resistant to leakage.

It is yet a further object of this invention to provide a baking pan which is simple in construction and relatively low in cost.

SUMMARY OF THE INVENTION

These and other objects of this invention are achieved by providing a baking pan for baking a plurality of stuffed pizzas and/or a plurality of stuffed sandwiches at one time. Each of the stuffed pizzas and/or stuffed sandwiches includes a hollow shell formed of baking dough, and a stuffing material located therein.

The pan comprises a base portion and plural cavity portions. The base portion comprises a generally planar member. Each of the plural cavity portions comprises a planar bottom wall and a frusto-conical side wall. The side wall of each of the plural cavity portions has a bottom edge secured to the bottom wall and a rounded top peripheral edge. The rounded top edge of each of the plural cavity portions is disposed slightly above the base portion to form sealing and cutting means at each of the cavity portions.

Each of the sealing and cutting means is arranged for joining a respective portion of baking dough disposed within its cavity portion to a sheet portion of baking dough disposed over the base member and on top of its cavity portion along the periphery of the rounded top peripheral edge thereof to form a stuffed dough shell having a joined seam extending about the periphery thereof. Moreover, each of the cutting and sealing means of each of the cavity portions is also arranged for severing portions of the baking dough located outside the periphery of the joined seam of the stuffed dough shell from the stuffed dough shell itself.

DESCRIPTION OF THE DRAWINGS

Other objects and many attendant advantages of this invention will become readily appreciated as the same becomes better understood by reference to the following detailed description when considered in connection with the accompanying drawings wherein:

FIG. 2 is an enlarged exploded isometric view of a portion of the multiple cavity pan shown in FIG. 1;

FIG. 3 is an enlarged sectional view taken along line 3—3 of FIG. 1 and showing an initial step in the process of forming stuffed pizzas or stuffed sandwiches in the compartments of the pan;

FIG. 4 is a sectional view, similar to FIG. 3, but showing a later step in the process of forming the stuffed pizzas or stuffed sandwiches in the compartments of the pan;

DETAILED DESCRIPTION OF THE PREFERRED EMBODIMENTS

Figure 1:
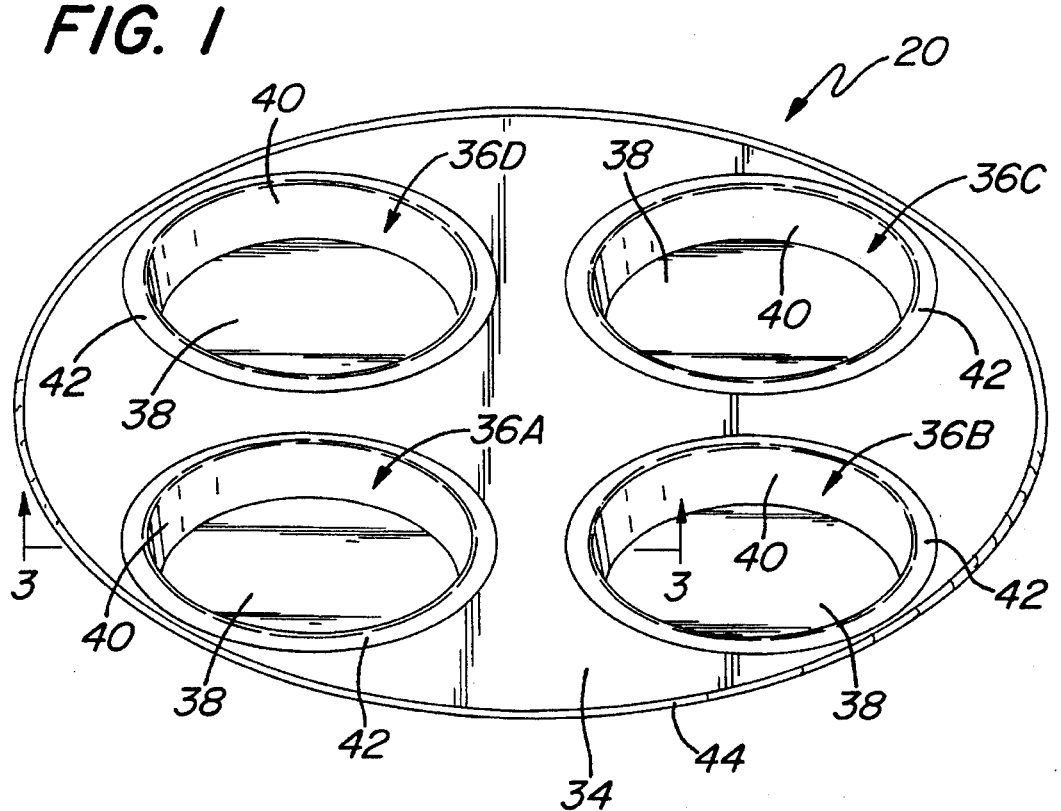
FIG. 1 is an isometric view of a multiple, e.g., four, cavity pan constructed in accordance with this invention for baking stuffed pizzas or stuffed sandwiches.

Referring now to various figures of the drawing where like reference numerals refer to like parts there is shown at 20 in FIG. 1 a multi-compartment baking pan constructed in accordance with this invention. The pan 20 is arranged for forming plural stuffed pizzas or plural stuffed sandwiches out of uncooked dough and the desired stuffing ingredients, while also serving as the baking pan in which the formed pizzas and/or sandwiches are baked.

Figure 5:
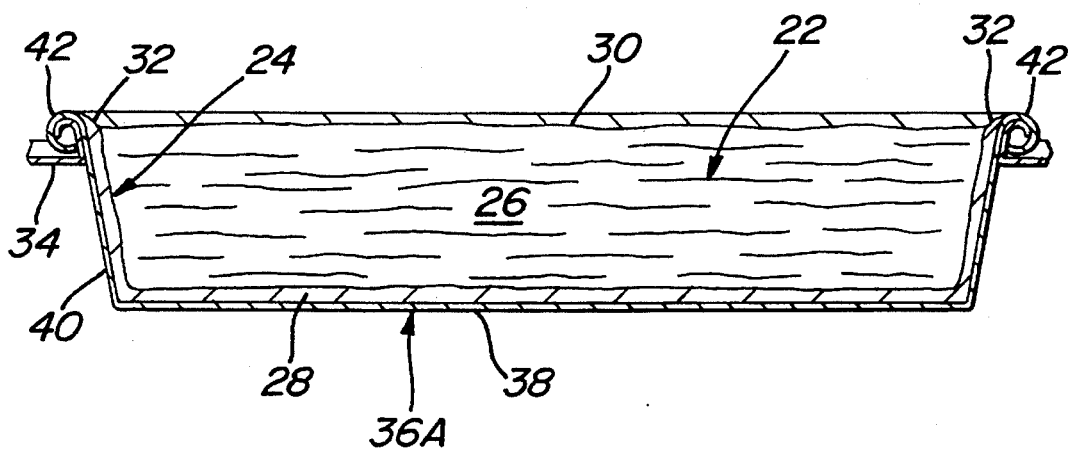
FIG. 5 is a sectional view, similar to FIGS. 3 and 4, but showing only one compartment of the pan after the formation of a stuffed pizza or stuffed sandwich therein.

Before describing the pan 20, and its method of use, a brief description of the stuffed pizzas or stuff sandwiches produced by this invention is in order. For the purposes of this application a stuffed pizza is shown in FIG. 5 and is designated by the reference number 22. A stuffed sandwich would have the same general construction, the only difference being in the types of food ingredients used. Thus, the item 22 represents both a stuffed pizza and a stuffed sandwich.

As can be seen in FIG. 5 the stuffed pizza/sandwich comprises a hollow, generally circularly shaped hollow shell 24 enclosing and containing the desired stuffing(s) 26. The shell 24 is formed of dough, which when rolled out and formed by the pan 20 (as will be described later) comprises two basic components. One component is a generally frusto-conically shaped base 28 into which the stuffing(s) 26 is disposed. The other component is a generally planar cover 30. The cover 30 is disposed over and secured to the base 28 after the base is filled With the stuffing 26 to seal the stuffing therein. In particular, the cover 30 is sealed to the upstanding peripheral edge of the base 28 along a peripheral seam or joint 32. When the pizza/sandwich is baked the joint is rendered permanently sealed and is sufficiently liquid-tight to preclude any stuffing from exiting therethrough.

Figure 6:
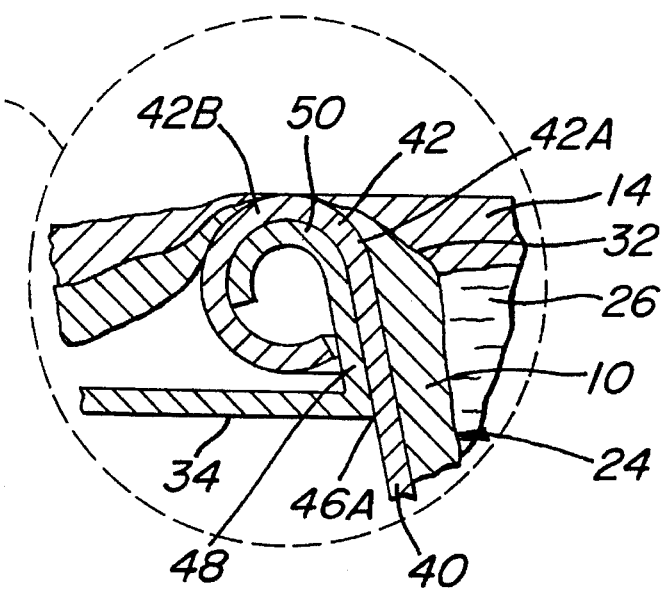
FIG. 6 is a greatly enlarged sectional view of the portion of the pan shown within the broken line circle in FIG. 4.
Figure 7:
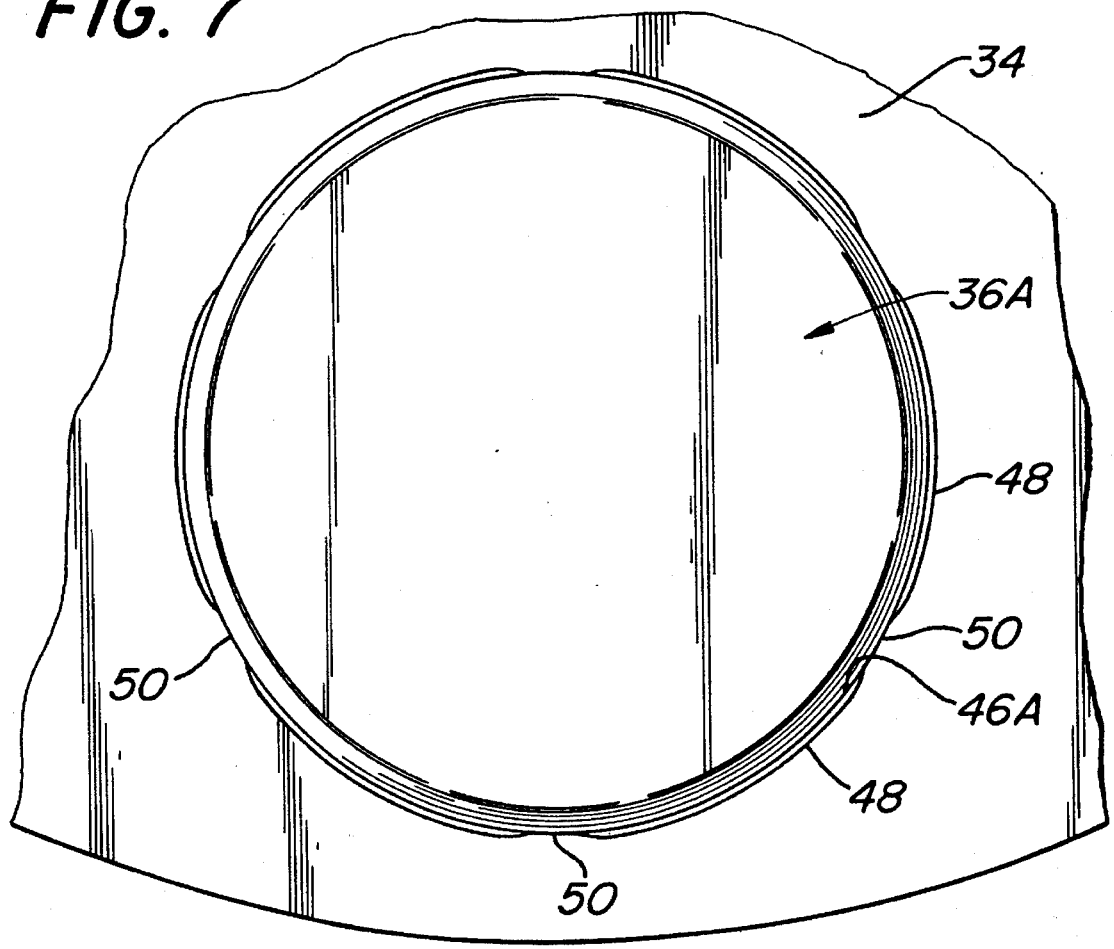
FIG. 7 is a bottom plan view of a portion of the multi-compartment pan of FIG. 1.

Referring to FIG. 1, it can be seen that the pan 20 basically comprises a generally planar base portion or plate 34 and four circular cavity portions or sections 36A, 36B, 36C, and 36D mounted in the base plate 34. Each of the cavity sections is of identical construction. Thus, in the interest of brevity only the cavity section 36A will be described in detail herein. To that end, as can be seen in FIGS. 1, 2 and 3, the cavity section 36A basically comprises a unitary body having a generally planar bottom wall 38, and a frusto-conical side wall 40 projecting upward from the bottom wall. The top rim of the side wall 40 is in the form of an outward and downward rounded rolled edge 42, as best seen in FIG. 6. This rounded rolled top peripheral edge 42 forms what can be deemed to be sealing and cutting means for the cavity section 36A. In particular, as will be described later, the edge 42 cooperates with pressure application means, e.g., a rolling pin (to be described later), to seal the peripheral seam or joint 32 of the dough shell 24 to enclose the stuffing 26 therein and thereby create a stuffed pizza/sandwich shell, while also severing scrap portions of the dough which are located outside the periphery of the stuffed pizza/sandwich shell. Thus, the scrap dough portions can be readily removed from the pan and the pan with the plural stuffed pizza/sandwich shells can then be placed in an oven for cooking.

The base plate 34 of the pan 20 is a thin sheet or panel of circular profile and having a peripheral upward rolled edge 44 (FIG. 3) to form a lip for the pan 20. This lip prevents spillage of foodstuffs off of the base plate. Four identically sized circular holes only 46A and 46B of which can be seen are provided in the base plate 34. These holes are equidistantly spaced from one another and each is located the same distance from the center of the pan 20. The holes serve as means for mounting respective cavity sections 36A–36D therein. To that end each of the holes includes an upstanding annular flange 48 extending about its periphery. A plurality, e.g., 6, of equidistantly spaced tabs 50 project upward from the top edge of each flange 48. The flanges 48 and associated tabs 50 serve as connecting means for securing the cavity sections 36A–36D into their respective holes. In particular, during the fabrication of the pan 20 the frusto-conically shaped cavity portions 36A, 36B, 36C, and 36D are inserted into the holes 46A, 46B, (and the other two—not shown) respectively, so that the upstanding flanges 48 are received under the rolled peripheral top edges 42 of those cavity sections. A force is applied, by means not shown, the rolled peripheral top edge 42 of each cavity portion to cause it to bend into a slightly tighter arc, as shown in FIG. 6. This action bends and traps the associated upstanding flange 48 and tabs 50 of the pan's base plate 34 within the rolled top edge 42 to effectively fixedly secure the cavity section to the pan's base plate.

It must be pointed out at this juncture that the cross-sectional diameter of the rolled peripheral top edge 42 of each of the cavity sections 36A–36D is relatively large, e.g., approximately 6 mm in order to form the heretofore identified sealing and cutting means. As mentioned earlier, and as will be described in detail later, the sealing and cutting means is arranged for joining respective portion of baking dough forming the stuffed dough shell to form a leak-proof joint therebetween, while also severing portions of the dough located outside the periphery of the joined seam of the stuffed dough shell to enables that excess dough to be readily removed from the pan for potential reuse.

The making of plural stuffed pizzas/sandwiches will now be described. To that end a mass of uncooked pizza or sandwich dough is rolled out to form a sheet 10 (FIGS. 2 and 3) whose size is sufficient to cover the entire pan 20. The dough sheet 10 is placed on the top of the pan. Since the dough is flaccid, portions of it will sag into the respective cavity sections 36A, 36B, 36C, and 36D. These sagging dough portions conform to the frusto-conically shaped interior of those cavity sections as shown in FIG. 3. Thus a hollow dough pocket 12 is produced in each cavity section 36A–36D. The stuffing(s) 26 are then filled into the dough pockets 12 in each of the cavity sections. Then another rolled out sheet of uncooked pizza dough 14, whose size is also sufficient to cover the entire pan 20, is placed on top of the dough sheet 10 so that portions of it abut portions of the dough sheet 10, as also shown in FIG. 3. In particular, portions of the upper dough sheet 14 abut portions of the lower dough sheet 12 along the periphery of each of the cavity sections and between the adjacent cavity sections, while Other portions of the upper dough sheet 14 cover the pockets 12 with the stuffing(s) 26 therein.

A rolling pin 16 is then rolled over the abutting dough sheets and downward pressure is applied to the rolling pin, as shown in FIG. 4. Alternatively other pressure applicators can be used in place of the rolling pin in order to apply pressure to the dough located on top of the rolled edges 42 of each of the cavity sections 36A–36D. As clearly shown in FIGS. 4 and 6 the pressure applying action of the rolling pin 16 rolling over the dough sheets 10 and 14 causes the arcuate inner portion 42A (FIG. 6) of each of the rolled peripheral edges 42 to tightly squeeze the abutting portions of the pizza dough sheets 10 and 14 therebetween. This seals those abutting dough portions together to form the heretofore identified seam 32 for the shell 24. At the same time the uppermost portion 42B (FIG. 6) of each of the rolled peripheral edges 42 severs the abutting dough portion at a partition line. The partition line thus defines the outer periphery of the pizza shell.

The portions of the dough sheets disposed outside the periphery of each of the shells, i.e., the excess dough portions 54, can be readily removed from the pan for reuse later. Once those excess dough portions 54 have been removed, the pan 20 with the four uncooked stuffed pizza/sandwich shells 24 therein can be placed in an oven (not shown) to bake the pizzas/sandwiches. In particular, the pan 20 is placed in the oven so that the bottom surface of the base walls 38 of each of the cavity sections 36A–36D is disposed on the heated oven floor. This enables the heat from the oven floor to be quickly conducted to the cavity sections 36A–36D holding the stuffed pizza/sandwich shells. Moreover, the material making up the pan is preferably a very good thermal conductor to ensure rapid and even cooking of the stuffed pizza/sandwich shells. If desired, vent apertures (not shown) can be provided about the periphery of each of the cavity sections to establish some convection cooking action.

As can be seen clearly in FIGS. 3 and 4 the height of the lip 44 of the pan's base plate is less than the height of the rolled peripheral edges 42 of the cavity portions 36A, 36B, 36C, and 36D so that the lip does not interfere with the dough sealing and severing operation of the edges 42, as described above.

In accordance with a commercial embodiment of this invention the pan 20 is formed of a sheet of cold rolled blue iron in the interests of uniform thermal conduction and good strength. The sheet is approximately 0.8 mm thick and is cut, stamped and rolled into the desired shaped components forming the pan.

It should be appreciated by those skilled in the art that other materials can be used to fabricate the pan, e.g., stainless steel, glass, copper, etc., with the thickness of such materials being a function of the type of material used.

The size of the pan, and the number of cavity sections provided is a matter of choice for the designer, e.g., is a function of the size and number of the pizzas/sandwiches to be made. In the commercial embodiment of this invention the diameter of the pan 20 is approximately 458 mm, the maximum inside diameter of each cavity portion (i.e., the inside diameter at the top of each cavity portion) is approximately 144 mm, the maximum outside diameter of each cavity portion (i.e., the outside diameter of the cavity at the rolled edge 42) is approximately 156 mm, and the depth of each of the cavity portions is approximately 30 mm. This arrangement enables the making of four conventionally sized stuffed pizza/sandwiches at one time. Moreover, in this commercial embodiment the space between the outermost edge of each of the cavity portions and the peripheral lip of the pan is approximately 10 mm and the space between the closest points of adjacent cavity portions is approximately 40 mm. The 10 mm and 40 mm spacings ensure that there is sufficient space between adjacent upstanding portions of the pan to prevent any excess dough from sticking therebetween.

As should be appreciated by those skilled in the art, the pan of this invention can be used for baking other food products than stuffed pizzas and/or stuffed sandwiches. Thus, the pan can be used to bake "pan pizza," focaccio, and other non-stuffed food products requiring baking.

Without further elaboration the foregoing will so fully illustrate my invention that others may, by applying current or future knowledge, adopt the same for use under various conditions of service.

I claim:

1. A method of forming plural stuffed pizzas and/or plural stuffed sandwiches at one time, wherein each of said pizzas and/or sandwiches includes a hollow shell formed of a dough and a stuffing material located therein, said method comprising the steps of:

(a) providing a pan comprising a base portion and plural cavity portions, said base portion having a generally planar member, each of said plural cavity portions comprising a planar bottom wall and a side wall, said side wall of each of said plural cavity portions having a bottom edge secured to said bottom wall and a rounded top peripheral edge, said rounded top peripheral edge of each of said plural cavity portions being disposed slightly above said base portion to form sealing and cutting means at each of said cavity portions;

(b) providing a base layer of dough across said pan so that respective portions of said base layer extend into said plural cavity portions to form respective dough pockets;

(c) filling said respective dough pockets with at least one stuffing material;

(d) providing a cover layer of dough across said pan so that respective portions of said cover layer of dough cover dough pockets with said stuffing therein; and (e) applying pressure across said cover layer dough and said base layer dough forming said dough pockets, whereupon said sealing and cutting means of each of said plural cavity portions causes respective portions of said base layer dough and said cover layer dough to abut and join each other to form a stuffed dough shell having a joined seam extending about the periphery thereof, and wherein the application of such pressure also causes each of said cutting and sealing means of each of said cavity portions to sever portions of said base layer dough and said cover layer dough which is located outside the periphery of said joined seam of the stuffed dough shell from the stuffed dough shell itself.

2. The method of claim 1 wherein said severed portions of the base layer dough and cover layer dough which are located outside the periphery of said joined seam are reused for forming other stuffed pizzas and/or stuffed sandwiches.

3. The method of claim 1 further comprises the step of baking the stuffed dough shell in said pan.

4. The method of claim 2 further comprises the step of baking the stuffed dough shell in said pan.

* * * * *